United States Patent
Sahay

Patent Number: 5,903,807
Date of Patent: May 11, 1999

[54] MAGNETIC BRUSH FOR USE IN AN ELECTROSTATIC OR MAGNETIC IMAGING APPARATUS

[76] Inventor: Ravi B. Sahay, 9176 Danby Ct., San Diego, Calif. 92129

[21] Appl. No.: 08/656,847

[22] Filed: May 30, 1996

[51] Int. Cl.$^6$ .................................................. G03G 15/09
[52] U.S. Cl. ........................................... 399/277; 399/229
[58] Field of Search .................................... 399/229, 267, 399/268, 277, 278, 289, 294

[56] References Cited

U.S. PATENT DOCUMENTS

| | | | |
|---|---|---|---|
| 2,786,439 | 3/1957 | Young | 399/277 |
| 2,786,440 | 3/1957 | Giaimo | 399/267 |
| 2,786,441 | 3/1957 | Young | 399/278 |
| 2,910,963 | 11/1959 | Herman | 118/623 |
| 2,930,351 | 3/1960 | Giaimo | 118/637 |
| 3,040,704 | 6/1962 | Bliss | 118/637 |
| 3,113,042 | 12/1963 | Hall | 399/294 |
| 3,117,891 | 1/1964 | Lehmann | 118/637 |
| 3,437,074 | 4/1969 | Hagopian et al. | 399/277 X |
| 3,545,968 | 12/1970 | Sato | 96/1 |
| 3,945,343 | 3/1976 | Berkowitz | 118/623 |
| 3,962,992 | 6/1976 | Takagi et al. | 118/637 |
| 5,210,551 | 5/1993 | Inoue et al. | 346/155 |

*Primary Examiner*—Fred L Braun
*Attorney, Agent, or Firm*—Frank G. Morkunas

[57] ABSTRACT

A solid-state selectably switchable combination cascade/magnetic brush for use in toner deposition or removal devices used in imaging machines of the electrostatic or magnetic type having one or more electro-magnets with one or more electro-magnetic windings and transfer heads placed inside, as well as outside, a photoconductor. Imaging mixture is agitated and conveyed to a transfer head which is exposed and adjacent to a photoconductor thereby eliminating the need for a drum or sleeve as the carrier/deposition agent for the imaging mixture. Transfer heads deposit imaging mixture directly onto a primary development zone with the excess cascading and attracting to a residual development zone and/or reclamation structure.

27 Claims, 3 Drawing Sheets

MAGNETIC BRUSH FOR USE IN AN ELECTROSTATIC OR MAGNETIC IMAGING APPARATUS

BACKGROUND OF THE INVENTION

This invention relates to an imaging machine of the electrostatic or magnetic type (dry or liquid), specifically to a switchable, self-propelled, pulsating magnetic brush which provides greater toner/developer agitation by longitudinal toner agitation, toner recapture, and residual toner development.

Magnetic printing techniques are well known to the copier and facsimile arts. In a typical magnetic printing machine, electrical signals are applied to magnetic recording heads which induce magnetic field variations in the surface of a moving, magnetic recording medium. The field variations produce a latent magnetic image on the surface of the recording medium which is adapted for attracting and retaining magnetic ink particles. An ink toner, which may be in dry particulate form, is applied to the latent magnetic image and may be transferred to paper or other hard copy media. In many respects, magnetic printing is similar to the more common electrostatic, or xerographic, printing wherein toner particles are attracted to the electric fields created by latent charge image on a dielectric medium.

High quality magnetic printing requires that the toner particles be uniformly distributed on the surface of the recording medium. The toner consists of highly mobile, dust-like particles and care must be taken to prevent the spread of these particles to other components of the printing system with resultant degradation of the printed image.

Magnetic brush structures have, for many years, been utilized for the transfer of toner in electrostatic printing machines. The toner, comprising ferromagnetic materials and insulating resins, is attracted to the surface of a hollow, applicator or cylinder (drum) rotatably disposed around a magnetic core. The magnetic core structure rotates with respect to the surrounding cylinder and carries the magnetic particles to the image surface in its magnetic field (development zone).

An imaging machine of the electrostatic type employs a photoconductor which is typically acted upon by six process steps. These steps are charge, expose, toner deposition or development, transfer, residual toner removal or cleaning, and erase.

Early electrostatic imaging machines carried out the development step using a process referred to as cascade development. In cascade development system, the developer mixture is made to fall under gravity to make contact with the latent image on the photo receptor (photoconductor). Cascade development system was capable of developing finer image details but the developed images were uneven. Cascade development eventually gave way to an improvement referred to as magnetic brush development which has proved to be more reliable and capable of superior image quality. Magnetic brush type toner deposition devices serve to continuously attract and transport magnetic imaging material from a supply reservoir to the photoconductor and return unused or spent material to the reservoir.

U.S. Pat. No. 3,040,704 to Bliss, Jun. 26, 1962 disclose the essential elements of current magnetic brush practice. This patent discloses the use of a non-rotating, cylindrical magnetic field producing structure surrounded by a rotatable, non-magnetic sleeve (or drum) which is driven by a suitable driving source, such as a motor of any known type. In the non-rotating magnet type, the poles are stationary and parallel along the axis, which forms a linear brush perpendicular to the direction of the photoconductor movement.

Though historically xerographic image forming apparatus have used stationary magnet and rotating sleeve development devices in the development system where the magnetic brush makes physical contact with the photoconductor, new image-on-image non-contact based image development systems are using the rotating magnet type with fixed or moving sleeve (drum) development systems.

Cleaning devices in imaging machines of the electrostatic type commonly employ mechanical means to remove residual toner from the surface of the photoconductor. Because mechanical means can damage the photoconductor surface, magnetic brush type cleaning is sometimes utilized.

An object of this invention is to provide novel combination of cascaded and magnetic brush structure, for use in magnetic and electrostatic printing systems.

High quality magnetic or electrostatic printing requires that the toner particles be uniformly distributed on the surface of the recording medium. The toner consists of highly mobile, dust-like particles and care must be taken to prevent the spread of these particles to other components of the printing system with resultant degradation of the printed image.

The magnetic brush structures of the prior art, while suitable for the application of toner to electrostatic images, produce a strong magnetic field component in the plane of the recording medium surface. These field components will distort and erase the magnetic latent image in a magnetic printing machine and prevent the use of prior art magnetic brush structures in such magnetic printing machines.

U.S. Pat. No. 3,945,343 to Berkowitz Mar. 23, 1976 discloses an improved magnetic brush for use in magnetic printing which minimizes the interaction between the magnetic brush field and the recorded magnetic image by intelligent placing of pole pieces in a stationary magnet and rotating sleeve (drum) magnetic brush system.

Color capable imaging machines of the electrostatic type develop images using a plurality of magnetic brush type toner deposition devices. Typically, these machines possess one toner deposition device for each of four colors—cyan, magenta, yellow, and black. The machines act to sequentially deposit toner of the first color, followed by toner of the second color followed by toner of the third color, followed by toner of the fourth color. To maize image quality, only one magnetic brush is permitted to deposit toner images on the photoconductor at any given time either by the brush physically touching the photo conductor or by the brush being in close proximity but not touching the photoconductor.

In the traditional contact development process, this sequential imaging process is carried out by physically moving the first color magnetic brush close enough to touch the photo conductor only, followed by the second color magnetic brush only, followed by the third color magnetic brush only, followed by the fourth color magnetic brush only. The four images are transferred on the same paper sequentially in four steps so that the contacting magnetic brush is developing only one color image at any particular time.

In the new non-contact development process, this sequential imaging process is carried out by electrically enabling the first color magnetic brush to form the image on the photoconductor without touching the photo conductor, followed by the second non-contact color magnetic brush only, followed by the third non-contact color magnetic brush only, followed by the fourth non-contact color magnetic brush only. The four images are transferred and overlaid (image on image) first on the same area on the photoconductor in four steps to form the single color image. In this process, the non-contacting magnetic brush or electrostatic brush is used develop one color image on top of the next color. Due to the non-contact nature of the magnetic brush the image on the photo conductor is not smeared. Finally, the color image is transferred to a media or paper in one single step.

An object of this invention is to combine the advantages of cascade and magnetic brush development system in a compact space and to provide very high reliability, high performance and low cost development system. As noted below, few of the prior art inventions disclose methods of combining cascade and magnetic brush development.

U.S. Pat. No. 2,910,963, to Herman, Nov. 3, 1956 discloses a structure using electromagnets to create a pulsating magnetic field over the total area of the photo-sensitive and exposed paper. This pulsating magnetic field produces a constant agitation of developer mix which can be controlled either by varying the intensity of the magnetic field produced or by varying the frequency of the pulsating field in order to obtain optimum results.

U.S. Pat. No. 2,930,351 to Giamo, Mar. 29, 1960, U.S. Pat. No. 3,545,968 to Sato, Dec. 8, 1970, and U.S. Pat. No. 3,117,891 to Lehmann, Jan. 4, 1964, disclose yet another structure for improving the cascade development method for electrostatic images by feeding ferromagnetic carriers in a developing space where the pulsating magnetic field is induced by various methods to improve the image quality, especially solid area coverage in a xerographic machine.

This prior art inventions suffer from the following disadvantages:

(a) they require a great deal of space around the circumference of the photoreceptor;

(b) they are difficult to switch off the development system quickly for color development;

(c) they are not practical for color processes due to the space requirements as noted in (a), as well as (b), above;

(d) the may require external driving means for creating toner agitation;

(e) they are not capable of making dynamic changes to the speed or direction of the developer mixture flow since this prior type of cascade method solely relies on gravity.

SUMMARY OF THE INVENTION

The above-noted problems, and others, are overcome with the improved solid-state magnetic brush for use in a electrostatic or magnetic imaging apparatus comprising at least one electro-magnetic within the imaging apparatus; the electro-magnetic having at least one electro-magnetic winding and at least one transfer head, the transfer head exposed and adjacent to a photoconductor in a development zone; a means for conveying imaging mixtures from a reservoir to a transfer head; means for agitating the imaging mixtures within the; and a means for longitudinally agitating the imaging mixtures along the transfer head.

This apparatus provides economical, reliable and versatile alternative to what is being used. When the improved magnetic device is energized by an poly-phase alternating or pulsating current, the developer mixture (toner and developer mixture in dual-composition mixtures and magnetic toner in single-composition mixtures, hereafter referred to imaging mixture) self-propels towards the tip of the comb-like electromagnetic structure and the imaging mixture moves in the axial direction (across the width of the photoconductor) providing the desired tumbling motion for image development. By controlling the intensity and the frequency of the magnetic field, some of the imaging mixture can also be made to fall similar to a cascade development system. The imaging mixture is collected by a magnetized belt and then transported and remixed with the in the reservoir containing the imaging mixture.

This invention is applicable to monochrome or multicolor image forming apparatus of magnetic, electrostatic, or reprographic type. The image development system could be contact or non-contact type or single-component or dual-component type which has both developer mixture and toner. The color image forming apparatus may develop all four colors on the photoconductor first before transferring it on media or it may develop each color on the photo conductor and then transfer it on the same media four times.

Accordingly, several objects and advantages of the present invention are:

(a) to provide uniform magnetic or electrostatic brush at low cost and high reliability;

(b) to provide imaging mixture tumbling properties in the magnetic brush with both cascade and electro-magnetic forces;

(c) to provide means for dynamically varying the speed, direction and intensity of the magnetic field and to selectively and segmentally energize electro-magnets should this prove advantageous for reasons of image quality or efficiency;

(d) to provide (a), (b) and (c) above with sufficient toner or developer mix flow rates so as to be functional in an imaging machine of the electrostatic type;

(e) to provide color development system within less space with fewer parts and actuators and thereby reduce design, manufacturing, and maintenance costs;

(f) to provide smooth (vibrationless) operation with color to color switching and thereby improve image quality, (g) to eliminate the need to apply an external driving force to the rotating magnet or rotating drum as required in the conventional development system; and (h) to eliminate the need for a drum as a imaging mixture carrier or deposition structure.

Further objects and advantages of the present invention are to enable non-circular magnetic brush configurations to extend the length or width of the magnetic-brush-to-photoconductor-contact-zone (development zone) and thereby avoid the need for a plurality of circular drums. Still further objects and advantages will become apparent from a consideration of the ensuing description and drawings.

BRIEF DESCRIPTION OF THE DRAWINGS

FIG. 3 shows an end view of various aspects of one embodiment a magnetic brush with the power source switched on.

DESCRIPTION OF PREFERRED EMBODIMENT(S)

Figure 1:
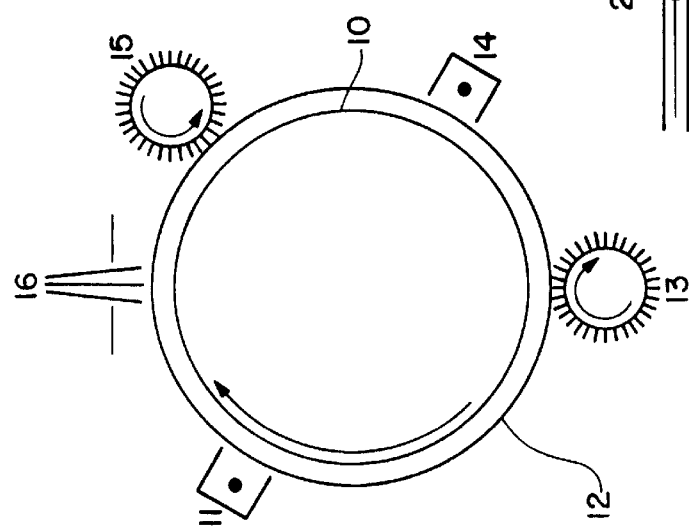
FIG. 1 shows a schematic of the electrostatic type imaging process.

As FIG. 1 shows, the electrostatic imaging process typically involves six process steps. Charge 11 first uniformly charges the surface of moving photoconductor 10. At expose 12, a light source is directed at the photoconductor to selectively erase areas of surface charge and create a latent electrostatic image. At magnetic brush devolopement 13 toner is attracted from a magnetic brush to the surface of moving photoconductor 10 by electrostatic forces. At transfer 14, toner is transferred from moving photoconductor 10 to paper. At magnetic brush cleaning 15, residual toner is attracted from the surface of moving photoconductor 10 to a magnetic brush. Finally, at erase 16, moving photoconductor 10 is flooded with light to eliminate the latent electrostatic image prior to the start of the next imaging cycle.

Figure 2:
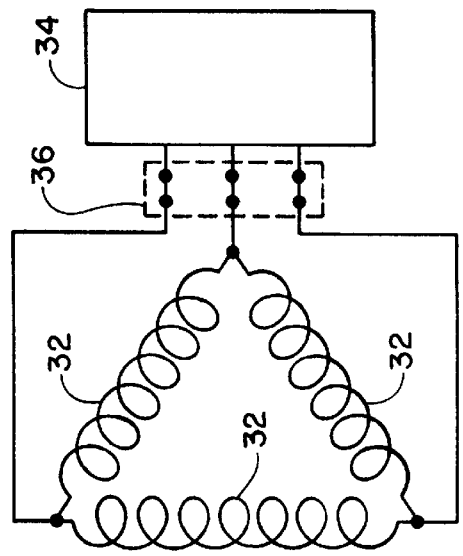
FIG. 2 shows an end view of various aspects of the current art magnetic brush practice.
Figure 3:
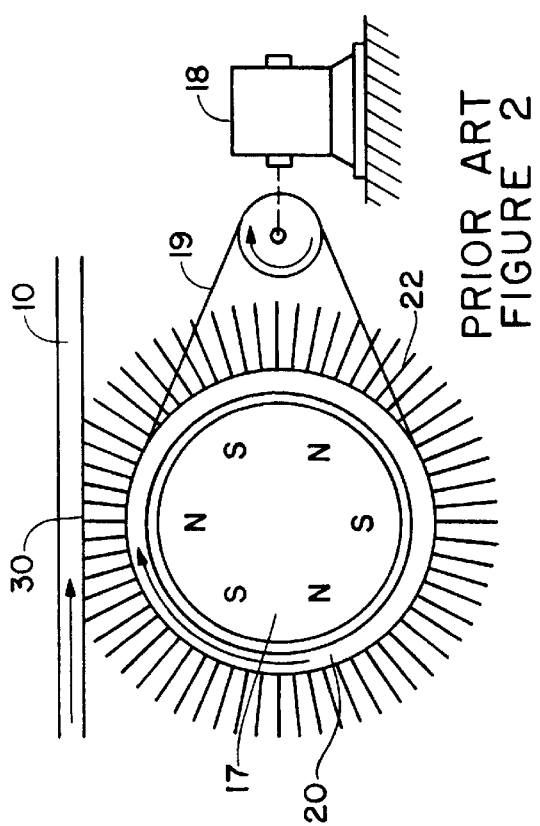
Figure 4:
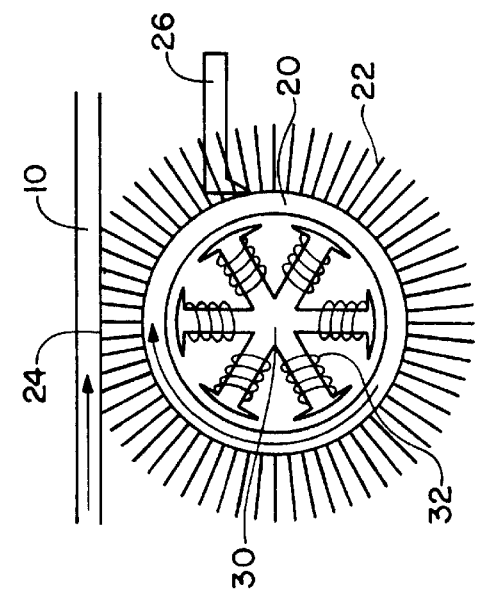
FIG. 4 shows a switchably controlled multi-phase power source.

In a typical magnetic brush embodiment (see FIG. 2), an external driving force is applied to rotate rotatably mounted drum 20. Stationary multi-pole permanent magnet 17 attracts magnetic toner and developer mix (imaging mixture) to the surface of rotatably mounted drum 20 and establishes magnetic brush 22 on the surface of the drum. Due to friction between magnetic brush 22 and the surface of rotatably mounted drum 20 and the rotation of rotatably mounted drum 20, magnetic imaging material is transported into magnetic-brush-to-photoconductor-contact-zone 24 (development zone). Electrostatic forces present in development zone 24 act to deposit toner on or remove toner (imaging mixture) from moving photoconductor 10. In one embodiment of a magnetic brush operation (see FIG. 3), stationary multi-pole electromagnetic 30 is energized by the switchably controlled power source shown in FIG. 4. That embodiment was described by Ravi B. Sahay (inventor in this application) and co-inventor David H. Feather in their application Ser. No. 08/429,321 filed on Apr. 26, 1995. In that embodiment, power source 34 is a multi-phase alternating current power supply which generates a rotating magnetic field in stationary multi-pole electromagnet 30. The rotating magnetic field attracts magnetic imaging material to the surface of drum 20 and establishes a magnetic brush 22. Drum 20 could be a rotatable drum or tube-like structure, a fixed drum or tube-like structure, or an elongated drum (fixed or rotatable) or elongated tube-like structure (fixed or rotatable).

Simultaneously, magnetic imaging material 21 is transported into development zone 24. Electrostatic forces present in development zone 24 act to deposit toner on or remove toner from moving photoconductor 10. Means for removing and reclaiming toner (toner removal means) may be any conventional means, any mechanical means, or by at least one magnetic brush cleaning 15 positioned beyond transfer 14 as shown in FIG. 1. Use of a mechanical removal means usually also entails use of permanent magnets rather than electromagnets and involves any mechanical means such as scraper 26. After removal of unused imaging mixture from photoconductor 10, unused imaging mixtures deposited in suitable reservoirs.

Color to color switching is required in color imaging machines of the electrostatic type to minimize image degradation or reclaim color toner by engaging removal means suited for the intended purpose. Color to color switching is accomplished in current practice by sequentially creating development zone 24 for each color one at a time.

Figure 5:
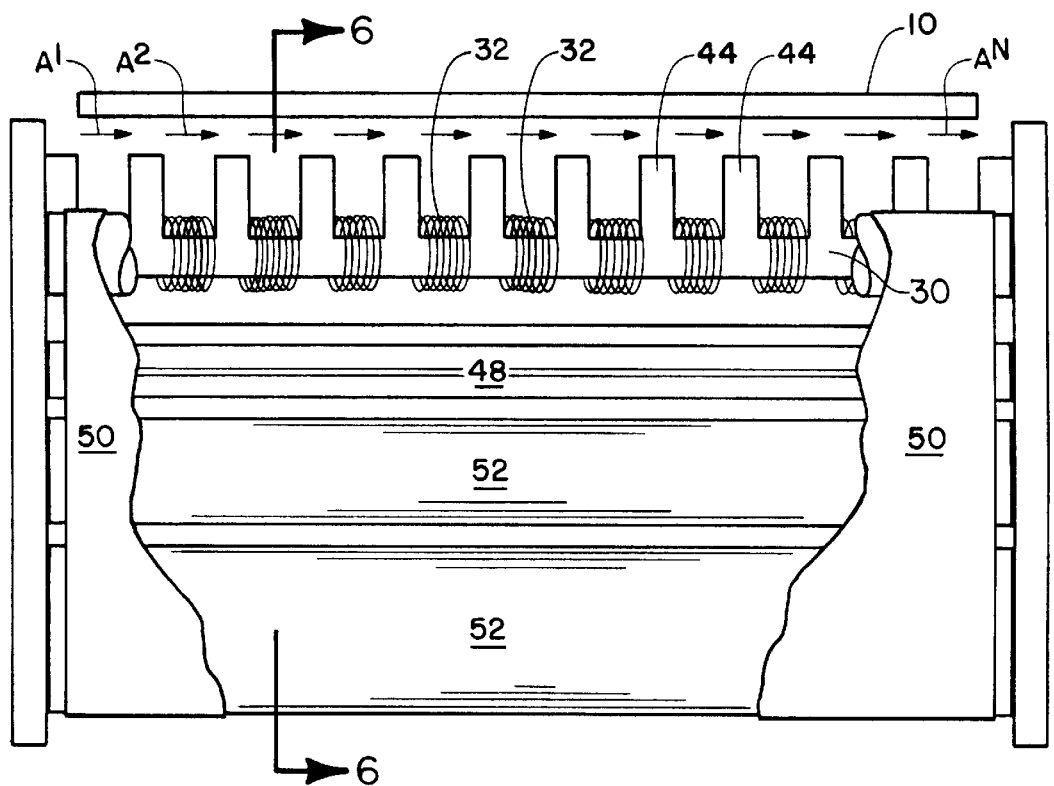
FIG. 5 shows a cut-away view of the current invention revealing the electromagnet.
Figure 6:
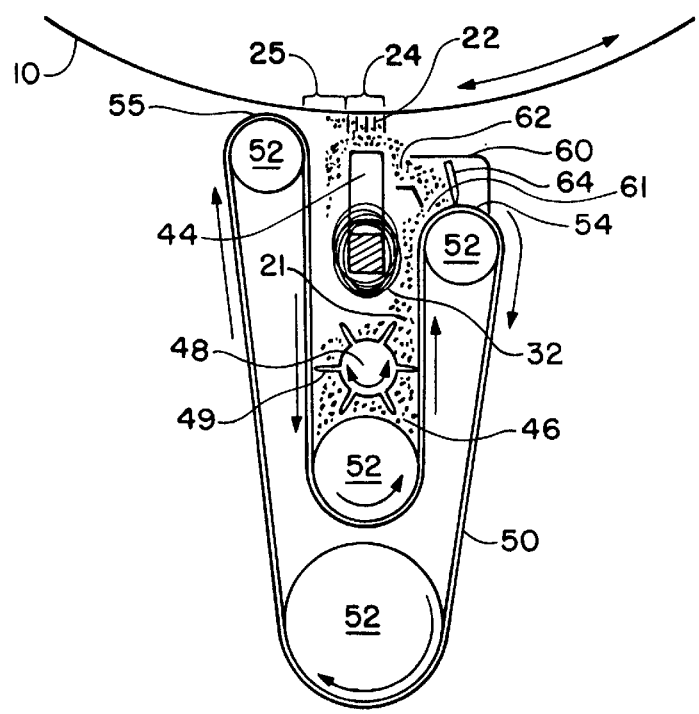
FIG. 6 is a view of the current invention taken along line 6—6 of FIG. 5.

In cut-away format, FIG. 5 shows the current invention. Electromagnet 30 lies adjacent to photoconductor 10 and completely across its development zone. Electromagnet 30 has one or more electro-magnetic windings 32 and one or more transfer heads 44. One or more such electro-magnets may be adjacent to (inside and/or outside of) photoconductor 10. Magnetic belt 50 envelopes electromagnet 30. A drum to rotate, tumble, and carry imaging mixture becomes, and is, unnecessary. FIG. 6 shows that magnetic belt 50 forms an endless loop by use of a plurality of rollers 52. The envelope formed by magnetic belt 50 around electromagnet 30 creates an imaging mixture reservoir 46 within. Imaging mixture 21 is contained therein and agitated by fins 49 from agitator 48 within imaging mixture reservoir 46.

Magnetic forces from magnetic belt 50 attract imaging mixture 21 and carry it to hopper 60. Imaging mixture 21 enters hopper 60 at inlet 61. Hopper 60 lies at magnetic belt first end 54 and is in linear cooperation with transfer head 44. Magnetic belt second end 55 extends beyond magnetic belt first end 54 and beyond transfer head 44. Within hopper 60, hopper scraper 64, in contact with magnetic belt 50 removes imaging mixture 21 and diverts it down chute 62. Energy, which could be pulsating, is applied to electromagnet 30 electro-magnetic winding 32 by power source 34. Such application can be regulated back and forth across one transfer head 44, sequentially across more than one transfer head as well as back and forth across individual transfer heads, selectively to one or more transfer heads, and segmentally as needed for the preferred image reproduction. As shown in FIG. 5, imaging mixture 21 may travel in the direction of arrows $A^1$ through $A^n$. By adjusting or reversing the current, imaging mixture 21 may also travel in the direction $A^n$ to $A^1$.

As energy is so applied, development zone 24 is also created. Imaging mixture 21 is electro-magnetically attracted from chute 62 onto transfer head 44, and onto development zone 24 and cascade onto residual development zone 25 for imaging mixture transfer and image reproduction. Excess imaging mixture not directly attracted to development zone 24 continues cascading onto magnetic belt second end 54 and to residual development zone 25 in the process. Such residual attraction provides an initial imaging attraction in the reproduction process and enhances the reproduction quality in the primary development zone 24. Imaging mixture 21 not attracted to development zone 24 and residual development zone 25 cascades onto magnetic belt 50 at or near magnetic belt second 55 and is returned to imaging mixture reservoir 46. End walls (not shown) on each side of magnetic belt 50 or photoconductor 10, as suited for the intended purpose, enclose and contain imaging mixture 21 within imaging mixture reservoir 46.

Magnetic belt 50 may also be less in width than the length of development zone 24. In such case, magnetic belt 50 would lie on only one end of development zone 24 ($A^n$ side by way of example). In such configurations, imaging mixture reservoir 46 would reside in close harmony with electro-magnetic 30. Application of energy to electromagnet 30 would be such that all excess imaging mixture 21 would travel in directions $A^1$ through $A^n$ and back without cascading beyond or below transfer head 44. Such imaging mixture would attract to development zone 24 or travel to $A^n$ and attract to magnetic belt thereat.

Figure 7:
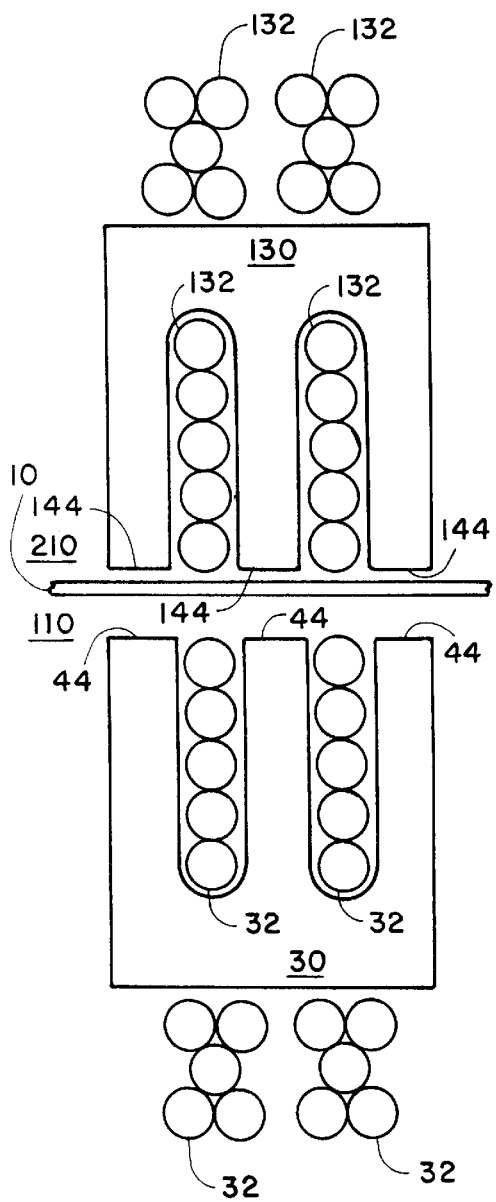
FIG. 7 is an end view of the current invention revealing a second set of electromagnets.
Figure 8:
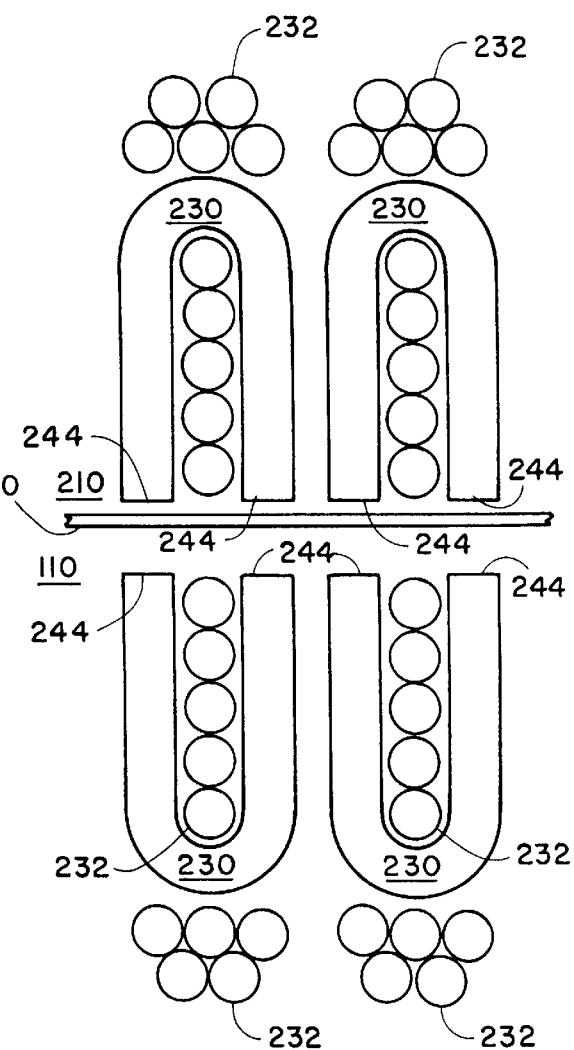
FIG. 8 is an end view of the current invention revealing multiple electromagnets inside and outside a photoconductor.

As seen in FIGS. 5 and 7 electro-magnet 30 resides outside 110 of photoconductor 10. To enhance imaging mixture potential, second electro-magnet 130 may also reside inside 210 photoconductor. The configuration of inside electro-magnet 130 is substantially similar as the configuration outside and previously described and shown in FIGS. 5 and 6. Electro-magnetic windings 132 lie substantially in between transfer heads 144. By selectively applying power source 34 to inside electromagnet 130 and outside electromagnet 30, magnetic attraction of imaging mixture 21 is markedly enhanced as well as image production quality. FIG. 8 shows that electro-magnet 30 need not be made of a single piece construction with one or more windings and transfer heads but also may be separate and individual electro-magnets. Individual electro-magnets 230 each having electro-magnetic windings 232 and transfer heads 244 thereon. Individual electro-magnets 230 may reside inside 210 or outside 110 of photoconductor 10.

The problems addressed above, among others, are overcome by the present invention. The improved magnetic brush device of this invention provides an economical, reliable, and versatile alternative to current practice. When the device is energized by an alternating current or pulsating direct current power source, the brush is electro-magnetically formed thereby eliminating the need for an external driving force. In color applications where color to color switching is required, the invention provides switching capability in an economical, reliable, noiseless, vibrationless, and rapid manner by simple electrical switching as opposed to complex electro-mechanical means.

While the above description contains many specificities, these should not be construed as limitations on the scope of the invention, but rather as an exemplification of several embodiments thereof. For example, the electromagnetic field strength or the frequency could be dynamically varied and selectively and segmentally varied along the electro-magnetic windings should this prove to be advantageous.

Accordingly, the scope of the invention should be determined not by the embodiments illustrated, but by the appended claims and their legal equivalents.

Accordingly, I claim:

1. An improved magnetic brush for use in a electrostatic or magnetic imaging apparatus have at least a photoconductor and a development zone, the improvement comprising:
   at least one selectively switchable electro-magnet within said imaging apparatus and in substantially direct contact with an imaging mixture, said electro-magnet having at least one electro-magnetic winding and at least one transfer head, said transfer head exposed and adjacent to said photoconductor in said development zone;
   means for conveying said imaging mixture to said transfer head, said conveying means further having an imaging mixture reservoir;
   means for agitating said imaging mixture within said imaging apparatus; and
   means for longitudinally agitating said imaging mixture along said transfer head.

2. The apparatus as described in claim 1 further comprising a means for transferring said imaging mixture from said transfer head onto said photoconductor within and adjacent to said development zone.

3. The apparatus as described in claim 1 further comprising a means for recovering said imaging mixture in excess of that imaging mixture transferring to said photoconductor; depositing said excess imaging mixture onto a residual development zone formed by said electromagnetic winding and transfer head, said residual development zone being adjacent to said development zone; and returning said excess imaging mixture to said imaging mixture reservoir.

4. The apparatus as described in claim 3 wherein said recovering means comprises a second end of said conveying means extending beyond said transfer head such that imaging mixture not transferred to said development zone and said residual zone fall to said second end and returns to said imaging mixture reservoir.

5. The apparatus as described in claim 1 wherein said electro-magnet has more than one electro-magnetic winding and more than one transfer head.

6. The apparatus as described in claim 1 further comprising more than one electro-magnet, at least one of which is inside said photoconductor and at least one of which is outside said photoconductor, such that said inside and outside electro-magnets are in magnetic communication with one another substantially within said development zone.

7. The apparatus as described in claim 6 wherein said inside electro-magnet and said outside electro-magnet have more than one electro-magnetic winding and more than one transfer head.

8. The apparatus as described in claim 1 wherein said conveying means comprises a magnetic belt having an endless loop having a first end and a second end, said belt configured such that said first end is folded over toward and substantially parallel to said second end, said belt thereby forming said imaging mixture reservoir, for holding said imaging mixture, and an open-end into which said electro-magnet is positioned such that said transfer head extends beyond said first end toward said photoconductor but not beyond said second end.

9. The apparatus as described in claim 1 further comprising a hopper having an inlet and a chute, said hopper being adjacent to said conveying means at a first end of said conveying means such that said imaging mixture is conveyed to said hopper by said conveying means, enters said hopper through said inlet, is displaced from said conveying means down said chute onto said at least one transfer head.

10. The apparatus as described in claim 9 wherein said hopper further comprises a scraper attached thereto which is in communication with said conveying means such that, as said imaging mixture is conveyed to said hopper through said inlet, said imaging mixture is released from said conveying means by said scraper and thereby attracts to said transfer head through said chute.

11. The apparatus as described in claim 1 wherein said agitation means comprises an agitation roller having a plurality of protruding longitudinal fins, said agitation roller being contained within said imaging mixture reservoir.

12. The apparatus as described in claim 1 wherein said longitudinal agitation means comprises a multi-phase power source for said electro-magnetic winding such that energy is conveyed to said windings in an alternating longitudinal manner, back and forth, across the width of said electro-magnet and back and forth across the width of said transfer head.

13. The apparatus as described in claim 12 wherein said power source further is selectively switchable such that any segment of said electro-magnetic winding may be energized by said power source.

14. The apparatus as described in claim 12 wherein said power source further is segmentally switchable such that any segment of said electro-magnetic winding may be energized by said power source.

15. An improved magnetic brush for use in a electrostatic or magnetic imaging apparatus have at least a photoconductor and a development zone, the improvement comprising:

at least one electro-magnet within said imaging apparatus, said electro-magnet having at least one electro-magnetic winding and at least one transfer head, said transfer head exposed and adjacent to said photoconductor in said development zone;

means for conveying an imaging mixture to said transfer head, said conveying means further having an imaging mixture reservoir;

means for agitating said imaging mixture within said imaging apparatus;

means for longitudinally agitating said imaging mixture along said transfer head; and a hopper having an inlet and a chute, said hopper being adjacent to said conveying means at a first end of said conveying means such that said imaging mixture is conveyed to said hopper by said conveying means, enters said hopper through said inlet, is displaced from said conveying means down said chute onto said at least one transfer head.

16. The apparatus as described in claim 15 further comprising a means for transferring said imaging mixture from said transfer head onto said photoconductor within and adjacent to said development zone.

17. The apparatus as described in claim 15 further comprising a means for recovering said imaging mixture in excess of that imaging mixture transferring to said photoconductor; depositing said excess imaging mixture onto a residual development zone formed by said electromagnetic winding and transfer head, said residual development zone being adjacent to said development zone; and returning said excess imaging mixture to said imaging mixture reservoir.

18. The apparatus as described in claim 17 wherein said recovering means comprises a second end of said conveying means extending beyond said transfer head such that imaging mixture not transferred to said development zone and said residual zone fall to said second end and returns to said imaging mixture reservoir.

19. The apparatus as described in claim 15 wherein said electro-magnet has more than one electro-magnetic winding and more than one transfer head.

20. The apparatus as described in claim 15 further comprising more than one electro-magnet, at least one of which is inside said photoconductor and at least one of which is outside said photoconductor, such that said inside and outside electro-magnets are in magnetic communication with one another substantially within said development zone.

21. The apparatus as described in claim 20 wherein said inside electro-magnet and said outside electro-magnet have more than one electro-magnetic winding and more than one transfer head.

22. The apparatus as described in claim 15 wherein said conveying means comprises a magnetic belt having an endless loop having a first end and a second end, said belt configured such that said first end is folded over toward and substantially parallel to said second end, said belt thereby forming said imaging mixture reservoir, for holding said imaging mixture, and an open-end into which said electro-magnet is positioned such that said transfer head extends beyond said first end toward said photoconductor but not beyond said second end.

23. The apparatus as described in claim 15 wherein said agitation means comprises an agitation roller having a plurality of protruding longitudinal fins, said agitation roller being contained within said imaging mixture reservoir.

24. The apparatus as described in claim 15 wherein said hopper further comprises a scraper attached thereto which is in communication with said conveying means such that, as said imaging mixture is conveyed to said hopper through said inlet, said imaging mixture is released from said conveying means by said scraper and thereby attracts to said transfer head through said chute.

25. The apparatus as described in claim 15 wherein said longitudinal agitation means comprises a multi-phase power source for said electro-magnetic winding such that energy is conveyed to said windings in an alternating longitudinal manner, back and forth, across the width of said electro-magnet and back and forth across the width of said transfer head.

26. The apparatus as described in claim 25 wherein said power source further is selectively switchable such that any segment of said electro-magnetic winding may be energized by said power source.

27. The apparatus as described in claim 25 wherein said power source further is segmentally switchable such that any segment of said electro-magnetic winding may be energized by said power source.

* * * * *